US008611516B2

(12) United States Patent
Lederer

(10) Patent No.: US 8,611,516 B2
(45) Date of Patent: Dec. 17, 2013

(54) METHOD AND COMMUNICATION DEVICE FOR ESTABLISHING AN ALTERNATIVE COMMUNICATION TRANSMISSION

(75) Inventor: Thomas Lederer, Herrsching (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 358 days.

(21) Appl. No.: 12/988,935

(22) PCT Filed: Apr. 28, 2009

(86) PCT No.: PCT/EP2009/003088
§ 371 (c)(1),
(2), (4) Date: Oct. 21, 2010

(87) PCT Pub. No.: WO2009/132826
PCT Pub. Date: Nov. 5, 2009

(65) Prior Publication Data
US 2011/0047279 A1   Feb. 24, 2011

(30) Foreign Application Priority Data

Apr. 30, 2008   (DE) .......................... 10 2008 021 608

(51) Int. Cl.
*H04M 3/00*   (2006.01)
(52) U.S. Cl.
USPC ................... 379/190; 379/201.07; 379/209.1; 379/211.02
(58) Field of Classification Search
USPC ......... 379/190, 211.02, 201.1, 207.1, 221.01, 379/209.01, 207.08, 201.07, 201.08, 379/201.11, 203.01, 207.12, 211.03, 212.01
See application file for complete search history.

(56) References Cited

U.S. PATENT DOCUMENTS 5,872,840 A * 2/1999 Wu ............................... 379/197
2005/0228509 A1 10/2005 James
(Continued)

FOREIGN PATENT DOCUMENTS

| DE | 4343657 A1 | 6/1995 |
|----|------------|--------|
| WO | 98/42114 A1 | 9/1998 |
| WO | 02/17603 A1 | 2/2002 |

OTHER PUBLICATIONS

International Search Report and Written Opinion of the International Searching Authority for PCT/EP2009/003088 (Forms PCT/ISA/220, PCT/ISA/210, PCT/ISA/237) (German).

(Continued)

*Primary Examiner* — Huy D Vu
*Assistant Examiner* — Kuo T Chiang
(74) *Attorney, Agent, or Firm* — Buchanan Ingersoll & Rooney PC

(57) ABSTRACT

The invention relates to methods and a communication device for establishing a communication transmission (ALTV), wherein upon detecting an original signaling (SIGRA) directed from a first terminal (EG2) to a second terminal (EG2) within the scope of an establishment of a connection, the second terminal (EG2) being addressed via a target address associated with the second terminal (EG2), it is recorded in what quantity further signalings ($SIG_{RA}$) having the same sender address specifying the first terminal (EG1) and the same target address are detected within the scope of further attempts to establish a connection. An evaluation of time information is carried out with regard to the times of the detection of the detected original signaling (SIGRA) and the detected further signalings (SIGRA) in relation to at least one predetermined time period. In case of a positive evaluation result, and upon exceeding the recorded number of detected further signalings having the same sender address and the same target address compared to a comparison value, an alternative communication transmission (ALTV) is established for a connection establishing attempt detected last of the further connection establishing attempts.

17 Claims, 3 Drawing Sheets

(56) References Cited

U.S. PATENT DOCUMENTS

| | | |
|---|---|---|
| 2005/0288002 A1 | 12/2005 | Sparks et al. |
| 2008/0002820 A1* | 1/2008 | Shtiegman et al. ...... 379/211.02 |
| 2008/0043969 A1* | 2/2008 | Shi ............................ 379/211.02 |
| 2008/0207180 A1* | 8/2008 | Peters ........................ 455/414.1 |
| 2009/0017802 A1* | 1/2009 | Zhang et al. ............... 455/414.1 |

OTHER PUBLICATIONS

International Search Report for PCT/EP2009/003088 (Form PCT/ISA/210) (English Translation).

Written Opinion of the International Searching Authority for PCT/EP2009/003088 (English Translation).

International Preliminary Report on Patentability for PCT/EP2009/003088 (English Translation).

\* cited by examiner

| Z | Q | T | N |
|---|---|---|---|
| 27935 | 089 6453120 | 2008.02.10 13:45 | 3 |
| 27935 | 063 12530 | 2008.02.10 14:00 | 1 |
| 20123 | 26 111 | 2008.02.10 13:50 | 2 |
| ⋮ | ⋮ | ⋮ | ⋮ |

FIG.2

METHOD AND COMMUNICATION DEVICE FOR ESTABLISHING AN ALTERNATIVE COMMUNICATION TRANSMISSION

CROSS-REFERENCE TO RELATED APPLICATIONS

This application is the United States National Phase under 35 U.S.C. §371 of PCT International Patent Application No. PCT/EP2009/003088, filed on Apr. 28, 2009, and claiming priority to German Patent Application No. 10 2008 021 608.9, filed on Apr. 30, 2008. Those applications are incorporated by reference herein.

BACKGROUND OF THE INVENTION

1. Field of the Invention

Embodiments relate to communications methods and communication devices for establishing a communication transmission after multiple failed connections with a target terminal.

2. Background of the Related Art

During a company's daily operations, it can occur that individual employees cannot always be reached easily on a workplace telephone within a company-wide telephone communication system. This happens, for example, if an employee is not at his workstation for a long period of time, such as when he is in a conference room, on a business trip, or on vacation. It frequently occurs that, if urgent matters arise, this employee needs to be reached regardless of where he is, so a caller usually has the less-than-optimal choice of either leaving a voice message on an answering device assigned to his workstation telephone or having to find out from other people where the desired employee is, so as to potentially reach him through an alternate telephone number. It is also often desired that an employee who is on vacation, on a business trip, or in a meeting be disturbed only for truly urgent calls. In addition, the employee might not want his or her alternate phone number—a mobile phone or private number, for example—to be generally available, since this alternative number would probably be used at other times when the employee actually could be reached at his primary workplace telephone.

BRIEF SUMMARY OF THE INVENTION

Embodiments provide methods and apparatus for connecting to a desired party, so that a caller with an urgent call can make contact with the desired party.

Embodiments relate to methods and a communication device for establishing a communication transmission (ALTV), wherein upon detecting an original signaling (SIGRA) directed from a first terminal (EG2) to a second terminal (EG2) within the scope of an establishment of a connection, the second terminal (EG2) being addressed via a target address associated with the second terminal (EG2), it is recorded in what quantity further signalings (SIGRA) having the same sender address specifying the first terminal (EG1) and the same target address are detected within the scope of further attempts to establish a connection. An evaluation of time information is carried out with regard to the times of the detection of the detected original signaling (SIGRA) and the detected further signalings (SIGRA) in relation to at least one predetermined time period. In case of a positive evaluation result, and upon exceeding the recorded number of detected further signalings having the same sender address and the same target address compared to a comparison value, an alternative communication transmission (ALTV) is established for a connection establishing attempt detected last of the further connection establishing attempts.

Additional advantageous further embodiments and designs of the invention are described in the attached claims.

BRIEF DESCRIPTION OF THE FIGURES

FIG. 2: a table showing how the number and time information is managed for incoming calls that are not connected successfully.

DETAILED DESCRIPTION OF THE INVENTION

Figure 1:
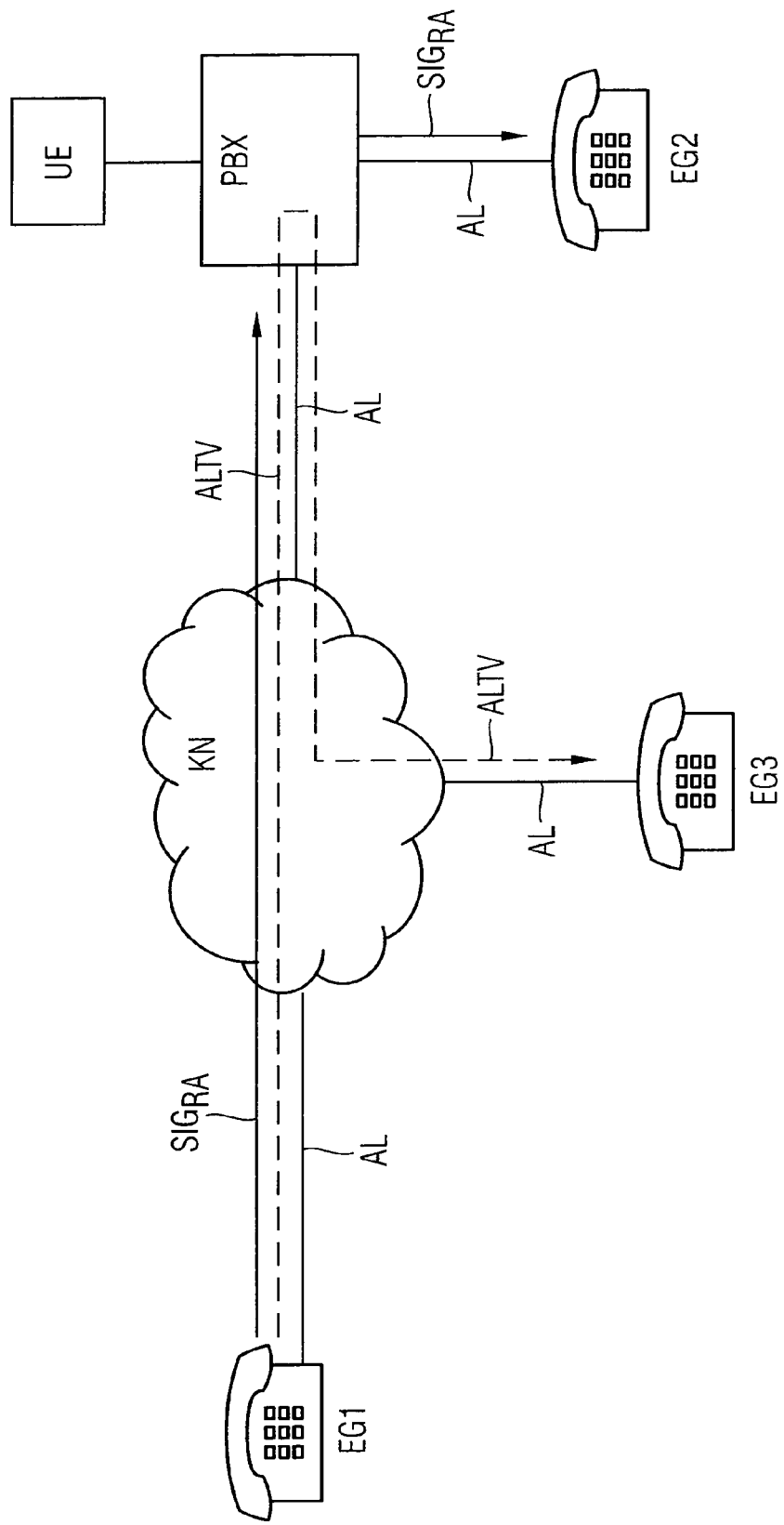
FIG. 1: a communication system with the equipment related to the invented method and the messages that appear in the communication system.

In one embodiment, the first prerequisite for the subsequent steps in the process is the detection of original signaling directed from a first terminal to a second terminal as part of establishing a connection. In this process, the second terminal is addressed using a target address assigned to the second terminal. After the original signaling is detected, the number of additional signalings with the same sender address specifying the first terminal and the same target address that are detected as part of additional attempts to establish a connection is determined. Time information is then evaluated in reference to the time at which the detected original signaling and the detected additional signalings were detected in relation to one or more preset time period(s). If the evaluation result is positive and the determined number of additional signalings with the same sender address and the same target address exceeds a comparison value for the latest detected attempt to establish a connection in the sequence of such attempts, then an alternative communication transmission is established.

The method is especially advantageous for this, because after multiple contact attempts within a preset time period, an alternative communication transmission—preferably directed to an alternative target address—is initiated with the expectation that the party being called, who is usually at the second terminal, is more likely to be reached at the alternative target address.

The original signaling and the additional signalings consist primarily of connection establishment signals for telephone connections over circuit-switched or packet-oriented networks. They can therefore consist especially of signalings that result in a busy signal or free signal for the second terminal being called, without a voice or data connection being established. In addition, signaling can result in being switched to an automated answering function. For these variations, it can also occur that the called party is not reached, so that no conversation between two parties takes place.

The first and second terminals are preferably wired or wireless telephones. They can also be mobile devices or telephony applications on workplace computers. The target address and the caller address are telephone numbers or addresses typically used in packet-oriented networks such as IP addresses (IP: Internet Protocol) or so-called SIP-URIs (SIP: Session Initiation Protocol; URI: Uniform Resource Identifier).

The minimum one time period described above is preferably a preset value for the maximum permitted amount of time between detection of the original signaling and detection of the latest incoming signaling. The interpretation is then the difference in the appearance or detection times between the latest received signaling and the original signaling (the one received first). A positive interpretation result is then given in the type of scenario where the time difference is smaller than the preset time period. This means that, for the invented method, a first party tries several times in a row from the first terminal to contact the second terminal. When a known number of contact attempts is reached or exceeded while the determined time difference remains within the preset time period, the first party's attempt to contact the second party is categorized as "urgent" and the alternative communication transmission is initiated or established.

The alternative communication transmission preferably reroutes the attempt to establish a connection to a third terminal, so that the latest signaling that went out from the first terminal and was received by the second terminal is modified such that new signaling is initiated between the second and third terminals, or alternatively there is signaling between the first and third terminals, with the goal of establishing a connection between the first and third terminals, so that the second party can be reached successfully at the third terminal.

In a further advantageous embodiment of the invention, the alternative communication transmission can be structured as a message to a third terminal, such as an SMS (Short Message Service) to a mobile telephone. This message can then display the aforementioned pieces of information from the previous signaling and a piece of information with the sender's address, so that it is easy for the second party to determine who urgently wishes to reach him and in what time frame that person has so far been trying to do so.

Alternatively to a transmission via SMS, it could also be another form of text, voice, or multimedia message. For example, an e-mail could be sent to an e-mail address. This is especially relevant to mobile terminals with e-mail capabilities. It would also allow communication with an instant messaging service or a "Push" service, as Blackberry™ calls this service. As previously explained, services that can be accessed from mobile terminals are especially preferable, and a preferred service ideally also has the ability to answer using a communication medium chosen by the caller, so that the second party is able to communicate with the first party from the third terminal.

The alternative communication transmission can thereby be initiated through the second terminal, using a communication system—especially if the second terminal is part of a telephone system—or through a transfer device such as a gateway. This type of device is preferably configured such that a target address for the third terminal, assigned to a piece of information that identifies the second terminal, is stored in it and can be read from it, so that the alternative communication transmission can be established by means of sending this target address.

In an advantageous further embodiment of the method, it can be possible to send a receipt to the first terminal that is sending the signaling when the alternative communication transmission is established, telling the first terminal by text or voice that a special preferred means of contacting the second party is now being used. This tells the first party that he no longer needs to continue manual attempts to establish a connection, because it is guaranteed that the second party will at least be informed of the previous contact attempts or that a connection will be established between the first and second party, i.e., between the first and third terminals.

The time information according to the invention can be evaluated in such a way that it simply consists of a time difference between receipt of the original signaling and receipt of the latest existing subsequent signaling. If the time difference exceeds the one or more preset time periods for a number of repeated signalings, this is calculated as a negative evaluation result. However, if the time difference is within the present one or more time periods, then the evaluation result is positive.

Alternatively or additionally, the time difference between two signalings can also be evaluated as the time information and used such that for a call to be classified as urgent a preset time period between two signalings is not exceeded. A positive evaluation result is then given if, after the original signaling, the time interval between any subsequent signaling and the signaling immediately preceding it exceeds the preset time period for all subsequently occurring signalings.

According to the invention, the number of additional signalings after the original signaling is counted. Preferably, a counter is used for this and is incremented for each signaling that occurs. The counter can be reinitialized and reset if one of the signalings results in successful contact with the second terminal for establishment of an active communication connection with the second party, or when the alternative communication transmission is established.

As an option, the counter can also be reinitialized when a busy signal is detected at the second terminal, since this generally means that the second party can now once again be reached via the second terminal.

As an alternative to this, the counter can be incremented when a busy signal is detected, because with highly mobile parties it cannot be guaranteed that the party will remain at that workstation for very long.

In one advantageous embodiment of the invention, the counter is incremented when one of the signalings between the first and second terminals results in notification that the line is free but no voice connection has been established, and the signaling and therefore the contact attempt were discontinued from the first terminal. This would be a scenario typically conceived if the second party isn't at the workstation and the first party hangs up after a certain amount of waiting time with notification that the line is free.

In a further advantageous embodiment of the invention, the counter is incremented when the signaling results in a voice connection being established from the first terminal only to an answering machine or a voicemail function, so that no direct voice connection between the first party and the second party is possible.

In another advantageous embodiment, the invented method can be activated or inactivated by the second party. This can be done manually or by evaluation of a so-called "presence status"—statuses such as "person is at his desk," "person is out of the office," "person is in a meeting"—which can be updated through the communication system depending on the second party's availability status.

The above-described invention and its further embodiments are explained in more detail below, using an execution example with reference to figures.

FIG. 1 contains a schematic diagram of a communication system in which a first terminal EG1, a switching unit PBX, and an additional terminal designated as the third terminal EG3 are arranged so that they can be connected on a communication network KN through the appropriate access lines and trunk lines AL.

Terminals EG1 and EG3 are preferably telephones for voice transmission. The communication network KN can be an analog or digital wired telephone network, but may also alternatively or additionally include packet-oriented transmission technologies or mobile wireless transmissions. The access or trunk lines AL are then either a fixed network connection or represent an access to a mobile wireless network through a wireless interface.

In addition, a second terminal EG2 is shown, which represents a system telephone on switching unit PBX. The connection from the second terminal EG2 to the switching unit PBX is also shown in FIG. 1 as access line AL.

Switching unit PBX can preferably be a telephone unit that controls multiple system telephones, such as an automated switchboard in a company network. If the switching unit PBX allows the throughput of other transmission technologies in addition, the switching unit PBX can also be a transmission device—commonly known as a gateway.

On the switching unit PBX, a monitoring unit UE is also connected, which preferably logs and evaluates signalings coming into the switching unit PBX and can also control the switching unit PBX in order to reroute connections, establish new connections, etc. The monitoring unit UE is shown in FIG. 1 as a separate unit, so the function can be integrated centrally in the switching unit PBX or can be operated peripherally through different telephones such as the second terminal EG2.

The steps of the invented method are explained below, with reference to FIGS. 1 and 2, with priority given to the representation in FIG. 2. FIG. 2 shows a table provided schematically and updated continuously by the monitoring unit UE. The table includes columns for a target telephone number Z, a source telephone number Q, a time T, and a number N. For the second terminal EG2, the target telephone number Z corresponds to the target address according to the invention and includes a piece of information—such as a telephone number—by means of which a terminal for connections can be addressed. For the first terminal EG1, the source telephone number Q corresponds to the sender's address according to the invention and includes information, transmitted as part of a signaling, that clearly identifies the terminal producing the signaling. This can be, for example, a telephone number transmitted through CLIP (Calling Line Identification Presentation).

Time T represents the time of the earliest connection attempt when there are multiple connection attempts. It is used to determine the time difference from the current time.

The number N represents the number of repeated signalings for different attempts to establish a connection, which were directed from each source telephone number Q to each target telephone number Z from an original signaling at time T up to the current time, with the goal of being able to establish a connection.

There can also advantageously be another table (not shown) in which the target telephone number Z is assigned to a configured alternative target address. This alternative target address represents an address that should be contacted for the alternative communication transmission, if multiple connection attempts failed within a preset time period.

An example of the method according to the invention is described below, with reference to FIGS. 1 and 2.

The initial situation is with all of the terminals EG1, EG2, EG3 shown in FIG. 1 being idle. It is assumed that a first party operates the first terminal EG1. It is further assumed that a second party can operate the second and third terminals EG2, EG3, since they are located in areas where he works, but for some reason the second party does not answer a connection attempt received at the second terminal EG2. One reason may be that the second terminal EG2 represents a telephone at the second party's desk, and the second party is not in the vicinity of his desk.

The initial situation further assumes that, in the table shown in FIG. 2, at the beginning of the process there is no entry for the telephone number of the second terminal EG2 as target number Z and the telephone number of the first terminal EG1 is present as source telephone number Q.

When a connection from the first terminal EG1 to the second terminal EG2 is desired, a signaling $SIG_{RA}$ is sent to make a call from the first terminal EG1 to the switching unit PBX and then on to the second terminal EG2. The call is routed by designating the telephone number assigned to the second terminal EG2 as the target address.

Establishment of this connection is detected by the monitoring unit UE, due to the signaling $SIG_{RA}$ coming through the switching unit PBX, and the monitoring unit reads and records the sender's telephone number for the first terminal EG1 and the target telephone number for the second terminal EG2 from the signaling $SIG_{RA}$. The current time is also recorded. Until that point there is no entry in the table shown in FIG. 2 for the value pair of the sender's telephone number and the target telephone number, so an entry for this value pair is created and the recorded time is also inserted in the entry as time T. Next the number 0 is inserted as number N for the number of repeats, because the recorded signaling $SIG_{RA}$ represents the first incoming signaling from the first terminal EG1 to the second terminal EG2 for the evaluation time period. This first recording signaling therefore represents the original signaling according to the invention.

It is assumed that the second party does not answer the incoming signaling $SIG_{RA}$ at the second terminal EG2 and so no voice connection is established. The attempt to establish a connection is therefore ended by the first terminal EG1 or by the switching unit PBX. The first and second terminals EG1, EG2 return to an idle state.

Now, after a short wait time, another attempt to establish a connection is initiated at the first terminal EG1, so that when another signaling $SIG_{RA}$ directed at the second terminal EG2 comes into the switching unit PBX, the monitoring unit UE detects the fact that within a short time two attempts to establish a connection have been initiated from the same sender terminal to the same target terminal.

The number of attempts to establish a connection is determined using the entry previously made in the table shown in FIG. 2 and reading from the number N field for the sending telephone number of the first terminal EG1, which can be determined from the signaling $SIG_{RA}$, and for the target telephone number of the second terminal EG2, which can also be determined from the signaling $SIG_{RA}$, such that by simply incrementing the value of number N, the now valid number of detected additional attempts to establish a connection is determined. The resulting value is Value 1 in the preceding example, because it concerns the entire second attempt to establish a connection from the first terminal EG1 to the second terminal EG2—therefore including the first repeated signaling—and so can be updated for the corresponding data set in the table shown in FIG. 2.

Next a time difference is generated as the time information according to the invention, and it is the time between the determined time at which the new incoming signaling $SIG_{RA}$ is detected and the value stored in the T field in the table shown in FIG. 2. This time difference is then compared with a preset reference time period as part of an evaluation done by the monitoring unit UE, wherein a time difference with a lower value than the reference time period is defined as a positive comparison or evaluation result.

In the case of a positive evaluation result, another test determines whether the number of detected attempts to establish a connection from the first terminal EG1 to the second terminal EG2—Value 1 from the preceding step in the method—exceeds a preset comparison value. Under the assumption that the comparison value is 3, for example, it does not occur in this case. Therefore, no particular processing takes place for the incoming signaling $SIG_{RA}$. At the second terminal EG2, an incoming call is signaled, and a line-free signal is sent out to the first terminal EG1.

Again in this case, the call is not connected, and the attempt to establish a connection is ended by the first terminal EG1.

It is now assumed that, after a short wait time, two more attempts to establish a connection are generated at the first terminal EG1 and directed to the second terminal EG2. The method's process operates correspondingly for the second attempt to establish a connection, under the assumption that the evaluation of the time information gives a positive result, i.e. the time period between the original first signaling $SIG_{RA}$ and the latest incoming additional signaling $SIG_{RA}$ does not exceed the reference time period.

By the two incoming signalings $SIG_{RA}$ as part of the two additional attempts to establish a connection, the number N is incremented respectively and so increases from 1 to 3, but number N still does not exceed the assumed comparison value of 3, so also in these two cases, no alternative communication transmission is initiated.

Below it is assumed that another attempt is made to establish a connection from the first terminal EG1 to the second terminal EG2, after a wait time that is not much longer than before. Another signaling $SIG_{RA}$ coming into the switching unit PBX is detected by the monitoring unit UE. Using the stored number N, the monitoring unit UE determines that this latest incoming additional signaling $SIG_{RA}$ is the fourth additional attempt to establish a connection from the first terminal EG1 to the second terminal EG2, and the fifth such attempt overall.

By comparing the determined number of 4 additional signalings with the assumed comparison value of 3, the monitoring unit UE can detect that the comparison value was exceeded, so one of the two criteria for establishing the alternative communication transmission is met.

The second criterion concerns evaluation of the time information. The system again determines the time period between the original signaling $SIG_{RA}$—whose time is read from the table shown in FIG. 2, Field T—and the time at which the latest incoming additional signaling $SIG_{RA}$ was detected. This time period is then compared to the preset reference time period as part of an evaluation performed by the monitoring unit UE.

In the preceding example, the determined time period was assumed to be shorter than the reference time period, which is considered to be a positive comparison or evaluation result. This also meets the second criterion.

According to the invention, because both criteria have been met, an alternative communication transmission ALTV is now initiated for the latest detected attempt to establish a connection. This could involve, for example, according to a configuration in the switching unit PBX, rerouting the call signaling to the third terminal EG3. The latest incoming signaling $SIG_{RA}$ is not routed by the switching unit PBX to the second terminal EG2, but instead a call signaling is sent to the third terminal EG3. At the first terminal EG1 that is generating the call, the same process as before continues, i.e., the current status of the target terminal—in this case now the third terminal EG3 and not the second terminal EG2—is transmitted to the first terminal EG1, so that it receives a line-free or busy signal depending on the status of the third terminal EG3. At the third terminal EG3, the incoming call is indicated acoustically and/or optically as is normal for that device, e.g., by a ring tone and/or light diode or display.

If the second party is now located in the vicinity of the third terminal EG3, he can answer the call, and there will be a successful voice connection between the first terminal EG1 and the third terminal EG3.

Preferably, rerouting to the third terminal EG3 is done in such a way that, for the alternative communication transmission ALTV, the telephone number of the first terminal EG1 is transmitted as the sender address signaled to the third terminal EG3.

In addition, the third terminal EG3 can be a device operated in a private household or a mobile wireless device belonging to the second party, wherein such a device has been configured to be the target for the alternative communication transmission, since it is more likely that the second party can be reached there. This clearly increases the chances of presumably urgent calls reaching the second party.

The method is made more beneficial by the fact that the urgency of the need for a connection is determined depending on both criteria: the number of connection attempts and the time interval between the first and latest connection attempt. It is further preferable that it be possible to prevent the actual telephone number of the third terminal EG3 from being sent to the first terminal EG1, so that the telephone number of the third terminal EG3, which perhaps should not be disclosed, is not revealed to the operator of the first terminal EG1.

Variations for as yet unexplained applications of the method are further explained below, with the explained steps described in conjunction with the previously discussed steps of the method.

The scenario has been described previously in which the first party makes multiple connection attempts in a short period of time and continues to get a line-free signal for the second terminal EG2, without achieving a successful voice connection.

In one variation of this execution example, if the time period between the first signaling $SIG_{RA}$ and the latest detected signaling $SIG_{RA}$ exceeds the preset reference time period, then the connection attempts are not categorized as urgent. The corresponding data set in the table shown in FIG. 2 is therefore reinitialized, i.e., the time when the latest incoming signaling was detected is entered for Field T and the value for Number N is reset to zero.

In the previous execution example, if both criteria were met, the call was rerouted to the third terminal EG3 with no further signaling to the second terminal EG2. Preferentially, however, signaling could take place to both terminals EG2 and EG3, so that both devices display the incoming call and the connection could be made with either of terminals EG2, EG3, whichever answers the call.

Alternatively, embodiments are also possible in which, when both criteria are met, signaling is directed first to the second terminal EG2 and then rerouted to the third terminal EG3 after three rings, for example.

An especially advantageous embodiment involves no forwarding to a further device, but rather an alternative communication transmission in the form of a short message to an alternate terminal. At the time of this application's submission, a standard form of short message is an SMS sent to a wireless mobile device. However, other forms of short messages can also be used.

Preferentially, the switching unit PBX can connect to a wireless mobile or SMS gateway (not shown). Once both criteria—time information and number of connection attempts—are met, the monitoring unit UE can contact the SMS gateway such that a short SMS text message is sent as the alternative communication transmission to the second party's wireless mobile device, with information about the first party's connection attempts. It can include, in particular, the telephone number of the first terminal EG1 and a time stamp for when the attempt was made to reach the second terminal EG2.

Preferentially, the telephone number of the first terminal EG1 can be entered as the sending telephone number for the SMS, so that a callback to the first terminal EG1 is easily possible, because wireless mobile devices generally offer a function for a displayed SMS that initiates a return call to the source number of an SMS as a simple menu selection.

It is furthermore possible that, for the content of the SMS, or alternatively an MMS (Multimedia Messaging Service), additional information can be requested from the first terminal EG1—in text or voice form—and can be integrated into the SMS or MMS as a type of reference information. In this way a second party, who may be in a meeting at that time, can learn the actual urgency of the request from the first party.

When an SMS or MMS is generated, a connection can be made between the first terminal EG1 and a service of the switching unit PBX, so that a voice communication can be sent to the first terminal EG1 saying that the second party is now being contacted in an alternative way and further attempts to establish a connection from the first terminal EG1 are not necessary.

To this point, only the case in which the second terminal EG2 rings and sends a line-free signal to the first terminal EG1 has been described as signaling which does not lead to a successful call. The attempt to establish a connection is then ended at the first terminal EG1.

However, in real systems, incoming calls are often rerouted to answering machines or even colleagues of the second party by means of call forwarding. For optimum use of the invention in such systems, such forwarded or routed calls should not be considered successful attempts to establish a connection within the scope of the invention, since the second party was not reached in such cases. It is also possible, when a connection is rerouted to an answering machine or call forwarding is used, for the invented process to continue such that both criteria are tested and the number N in the table shown in FIG. 2 is incremented if applicable.

In the illustrated execution example, it is further assumed that the second terminal EG2 and the third terminal EG3 are assigned to a single second party. The second party can operate the second terminal EG2 and/or the third terminal EG3, depending on where he is currently located. However, it is also possible that the second terminal EG2 is assigned to the second party, while the third terminal EG3 is assigned to a third party. In this case, it is easily possible to implement a vacation or illness substitution exclusively for urgent calls.

Figure 3:
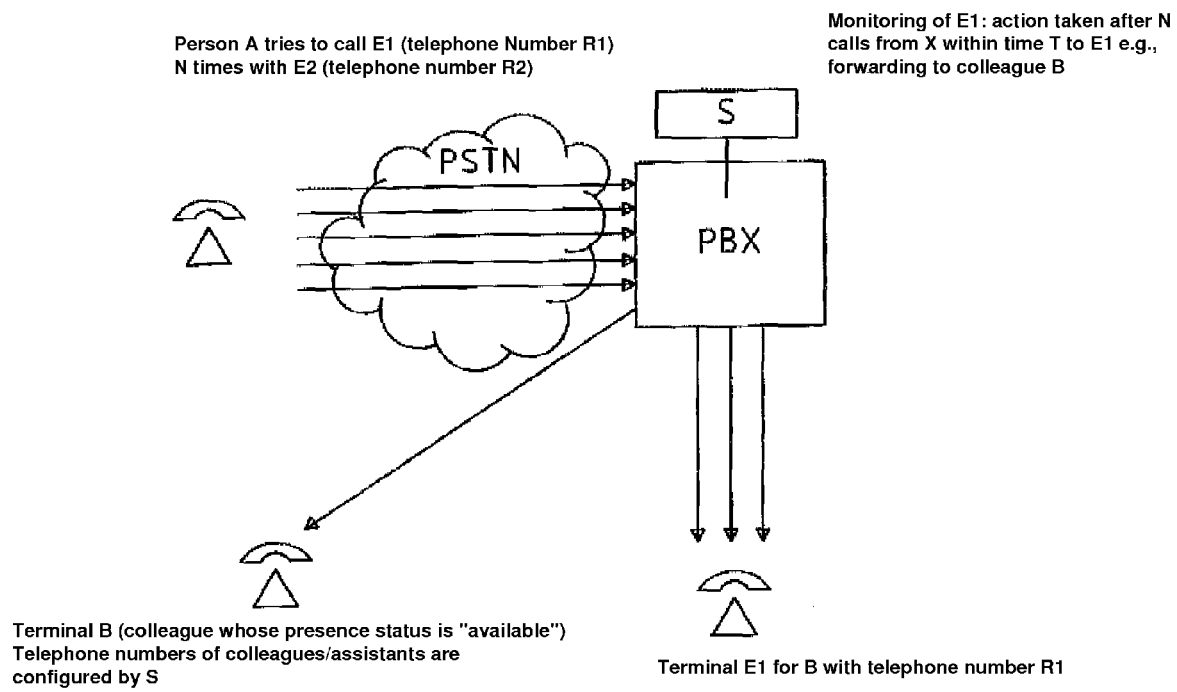
FIG. 3: a modified communication system with the equipment related to the invented method and the messages that appear in the communication system.

FIG. 3 shows a modified execution example of the communication system with the equipment required for the invented method and the messages appearing in the communication system, which is explained below.

Someone urgently makes repeated attempts to reach another person using a known office telephone number. Previously there was no way to designate a call as very urgent other than perhaps by sending e-mail messages. If one has no other telephone number (e.g., mobile phone number or private home number, or a colleague's number) for the desired person, one generally tries again after a short time to reach the desired person at the known telephone number, hoping that the person has come back in the meantime. It would be preferable for urgent calls to be routed to phone numbers of available colleagues by means of a filter function, without having to resort to alternative telephone numbers, wherein an 'available' designation means that the colleague is present. This would normally be done as follows:

Multiple calls to a person at the same telephone number during a short period of time and A message left on the answering machine in the hope that the called person is reachable or will call back.

Person A knows only telephone number R1 for Person B's communication device E1.

These disadvantages should be avoided by means of the modified embodiment of the invention.

A now tries to reach B by dialing R1 from terminal E1. The call is unanswered by B or the answering machine answers. A hangs up.

After a short period of time, the same process is repeated.

If this process occurs a total of N times within a time period T, the terminal E1 or the switching system P connected to E1 can initiate an action.

The function unit S (implemented within P or in an application external to P, or within or external to E1) monitors the calls to E1 and counts incoming calls from callers; if the threshold N is exceeded within time T, an action is initiated.

Two examples of such actions are as follows: The incoming call is forwarded to a colleague's telephone number known only to the system, or R2 assistance by referring to the colleague's presence status.

This modified embodiment should allow the upgrading of the real-time communication solution by improved and controlled reachability for urgent calls. In urgent cases, an available colleague is then automatically reached, without his or her telephone number having to be known or revealed. It is preferable for only urgent calls to be rerouted to colleagues, so that they are not disturbed for every call.

The invention claimed is:

1. A method for establishing a communication transmission comprising:

detecting an original signaling going out from a first terminal having a sender address and directed to a second terminal for attempting to establish a connection in which at least audio data having voice data is transmitted, wherein the second terminal is addressed by a target address assigned to the second terminal;

detecting additional signalings from the first terminal with the sender address specifying the first terminal and the target address assigned to the second terminal that are additional attempts to establish the connection with the second terminal;

determining a first amount of time that is defined by a time that passes from when the original signaling was detected to when a latest detected one of the additional signalings was detected and comparing that first amount of time to a first preset time period, wherein the first preset time period is a maximum amount of time between detection of the original signaling and a detection of the latest one of the additional signalings;

upon a determination that the first amount of time is less than the first preset time period and upon a determination that the detected number of the additional signalings is greater than or equal to a preset value, a switching unit rerouting the latest detected one of the additional signalings so that a third terminal is contacted to establish a connection with the first terminal in which audio data having voice data is transmittable between the first and third terminals;

upon a determination that a time difference between the latest one of the detected additional signalings and an additional signaling of the additional signalings that was immediately prior to the latest one of the detected additional signalings is less than a second preset time period, the rerouting of the latest one of the detected additional signalings being actuatable; and upon a determination that a time difference between when the latest one of the detected additional signalings was detected and when an additional signaling of the additional signalings that was immediately prior to the latest one of the detected additional signalings was detected is greater than the second preset time period, the determined number of additional signalings being counted such that no rerouting of the latest one of the detected additional signalings occurs.

2. The method of claim 1 wherein the switching unit detects the original signaling and detects the additional signalings.

3. The method of claim 1 wherein a monitoring unit detects the original signaling and detects the additional signalings, the monitoring unit being connected to the switching unit.

4. The method of claim 1 wherein the rerouting of the latest detected one of the additional signalings so that the third terminal is contacted to establish the connection with the first terminal comprises the switching unit addressing an alternative target address assigned to the third terminal to the latest detected one of the additional signalings such that the third terminal emits an indication of an incoming call.

5. The method of claim 1 wherein a monitoring unit detects the original signaling and also detects the additional signalings, the monitoring unit being operable peripherally via the second terminal.

6. The method of claim 1 wherein the rerouted signaling is also sent to the second terminal at the target address such that the connection is establishable upon one of the second terminal and the third terminal responding to that rerouted signaling to establish the connection.

7. The method of claim 1 comprising resetting the determined number of detected additional signalings when it is determined that the latest detected one of the additional signalings resulted in the establishment of the connection between the first terminal and the second terminal.

8. The method of claim 1 wherein the detected number of additional signalings is comprised of at least one additional signaling that was put through as an active communication connection between the first terminal and a voicemail function assigned to the target address.

9. The method of claim 1 wherein the detected number of additional signalings is comprised of at least one additional signaling that resulted in a 'busy' signal being sent to the first terminal.

10. The method of claim 1 comprising resetting the determined number of detected additional signalings upon a determination that the latest detected one of the additional signalings resulted in a 'busy' signal being sent to the first terminal.

11. The method of claim 1 during the rerouting, at least one of audio and text being transmitted to the first terminal to inform a user of the first terminal that an attempt to contact the user associated with the second terminal at a different device than the second terminal is being made.

12. The method of claim 1 comprising selecting the third terminal based upon presence status of at least one user associated with the third terminal and wherein the rerouting of the latest one of the additional signalings is comprised of changing the target address of that additional signaling to an alternative address assigned to the second terminal.

13. The method of claim 1 wherein the third terminal is a mobile wireless communication device that is predefined to be an alternative target address for the second terminal.

14. The method of claim 1 wherein the rerouting of the latest one of the additional signalings occurs such that the first terminal is unaware of an address of the third terminal.

15. The method of claim 1 further comprising recording the detected additional signalings in a table such that each one of the additional signalings is within the table such that a detected time at which that additional signaling was detected is also stored in the table to correspond with that additional signaling.

16. The method of claim 15 further comprising maintaining a table in which the target address corresponds with an alternative address, the alternative address being an address for the third terminal.

17. A communication device for establishing a communication transmission, comprising:

a detection unit for detecting an original signaling going out from a first terminal and directed to a second terminal for attempting to establish a connection between the first terminal and the second terminal in which audio data having voice data is transmitted between the first and second terminals, wherein the second terminal is addressed in the original signaling by a target address assigned to the second terminal;

a recording unit for determining how many additional signalings from the first terminal with the sender address specifying the first terminal and the target address are detected as additional attempts to establish the connection between the first terminal and the second terminal;

a time evaluation unit for evaluating time information regarding times at which the detected original signaling and the detected additional signalings were detected in relation to at least a first preset time period such that a first amount of time that passed between when the original signaling was detected and the latest one of the detected additional signalings was detected is determinable; and a transmitting unit, upon a determination that the first amount of time is less than the first preset time period and upon a determination that a detected number of the additional signalings within a second preset time period is greater than or equal to a preset value, the transmitting unit rerouting a latest detected one of the additional signalings so that a third terminal is contacted to establish a connection with the first terminal in response to the detection of the latest detected one of the additional signalings.

* * * * *